(12) United States Patent
Wahlin

(10) Patent No.: US 10,955,279 B2
(45) Date of Patent: Mar. 23, 2021

(54) ULTRASONIC FLUID MEASUREMENT PROBE WITH ULTRASONICALLY WELDED BASE CAP

(71) Applicant: The Boeing Company, Chicago, IL (US)

(72) Inventor: Sigvard Johann Wahlin, Bothell, WA (US)

(73) Assignee: The Boeing Company, Chicago, IL (US)

( * ) Notice: Subject to any disclaimer, the term of this patent is extended or adjusted under 35 U.S.C. 154(b) by 683 days.

(21) Appl. No.: 15/833,129

(22) Filed: Dec. 6, 2017

(65) Prior Publication Data

US 2019/0170559 A1    Jun. 6, 2019

(51) Int. Cl.
*G01F 23/296* (2006.01)
*G01F 15/14* (2006.01)

(52) U.S. Cl.
CPC ........ *G01F 23/2962* (2013.01); *G01F 23/296* (2013.01); *G01F 15/14* (2013.01)

(58) Field of Classification Search
CPC .... G01F 23/296; G01F 23/2962; G01F 15/14; G01F 15/18; G01F 25/0061; G01F 25/0007; G01F 15/066; G01F 1/696; G01F 15/06; G01F 23/0069; G01F 23/2961; G01F 23/28; G01F 15/003; G01F 15/022
See application file for complete search history.

(56) References Cited

U.S. PATENT DOCUMENTS

| | | | |
|---|---|---|---|
| 4,637,463 A * | 1/1987 | McCoy | E21B 47/047 166/250.01 |
| 5,148,700 A * | 9/1992 | King | G01F 23/2962 367/104 |
| 5,295,120 A | 3/1994 | McShane | |
| 5,397,460 A * | 3/1995 | Koblanski | B01D 17/0214 210/104 |
| 5,410,518 A * | 4/1995 | Birkett | G01F 15/14 367/87 |

(Continued)

FOREIGN PATENT DOCUMENTS

TW          201415057 A          4/2014

OTHER PUBLICATIONS

European Patent Office Office Action, dated Mar. 17, 2020, regarding Application No. 18210595.7, 5 pages.

(Continued)

*Primary Examiner* — Isam A Alsomiri
*Assistant Examiner* — Amie M Ndure
(74) *Attorney, Agent, or Firm* — Yee & Associates, P.C.

(57) ABSTRACT

An apparatus and method of measuring a level of fluid in a container and of enhancing reliability of an ultrasonic fluid measurement probe. A base comprises a transducer chamber, wherein the transducer chamber comprises a transducer chamber floor, a transducer chamber edge, and transducer chamber walls extending from the transducer chamber floor to the transducer chamber edge. An ultrasonic transducer is attached to the transducer chamber floor. A cap is welded to the transducer chamber edge such that the cap, along with the transducer chamber floor and the transducer chamber walls, encloses the transducer chamber to form an enclosed air space between the ultrasonic transducer and the cap.

20 Claims, 5 Drawing Sheets

(56) References Cited

U.S. PATENT DOCUMENTS

| | | | |
|---|---|---|---|
| 6,516,661 B1 | 2/2003 | Spillman, Jr. et al. | |
| 6,745,626 B2* | 6/2004 | Usui | B41J 2/17503 |
| | | | 73/290 R |
| 7,156,506 B2* | 1/2007 | Tsukada | B41J 2/17506 |
| | | | 347/19 |
| 7,225,670 B2* | 6/2007 | Tsukada | B41J 2/1752 |
| | | | 73/290 R |
| 7,481,105 B2* | 1/2009 | Schillinger | G01F 23/2962 |
| | | | 73/290 B |
| 7,717,544 B2* | 5/2010 | Stearns | B41J 2/04575 |
| | | | 347/68 |
| 7,900,505 B2* | 3/2011 | Mutz | G01N 29/222 |
| | | | 73/64.53 |
| 8,893,559 B2* | 11/2014 | Drachmann | G01F 15/14 |
| | | | 73/861.18 |
| 2003/0084732 A1* | 5/2003 | Ehrlich | G01P 5/245 |
| | | | 73/861.27 |
| 2005/0000279 A1* | 1/2005 | Yogeswaren | B06B 1/0622 |
| | | | 73/152.58 |
| 2016/0041024 A1 | 2/2016 | Reimer et al. | |
| 2016/0116324 A1* | 4/2016 | Job | G01F 23/0076 |
| | | | 73/290 V |
| 2018/0017423 A1* | 1/2018 | Allen | G01F 3/16 |

OTHER PUBLICATIONS

European Patent Office Extended Search Report, dated Apr. 23, 2019, regarding Application No. 18210595.7, 7 pages.

Terzic et al., "Ultrasonic Fluid Quantity Measurement in Dynamic Vehicular Applications; Chapter 2", Springer International Publishing, 2013, 26 pages.

Ford; "Ultrasonic fuel gauging", Aircraft Engineering and Aerospace Technology, vol. 70 Issue: 3, pp. 203-205, 1998. abstract only, https://doi.org/10.1108/00022669810215800.

* cited by examiner

ULTRASONIC FLUID MEASUREMENT PROBE WITH ULTRASONICALLY WELDED BASE CAP

BACKGROUND INFORMATION

1. Field

The present disclosure relates generally to systems and methods for ultrasonic fluid measurement. More particularly, the present disclosure relates to an ultrasonic fluid measurement probe for measuring the level of fluid in a container, such as for measuring the level of fuel in a fuel tank on an aircraft or other vehicle.

2. Background

Ultrasonic sensing uses ultrasonic transducers to transmit ultrasonic waves and to receive those ultrasonic waves reflected by an object. The time delay between transmission and reception of the ultrasonic waves may be used to determine the distance of the object from an ultrasonic transducer. Ultrasonic transducers may be used to determine the height or level of fluid in a container by reflecting an ultrasonic signal from the surface of the fluid in the container. For example, without limitation, ultrasonic sensing may be used for fuel gauging, to measure the level of fuel in a fuel tank on an aircraft or other vehicle.

A current fuel probe assembly is comprised of a piezoelectric transducer that is glued to a plastic base inside a cavity. The transducer has wires soldered to it. A foam pad is placed on top of the transducer to create an air space. The foam pad is covered by a polysulfide potting material to seal out fuel from the air space created by the foam pad.

There may be a need for a method and apparatus that take into account at least some limitations of current fuel probes, as well as other possible issues.

SUMMARY

In one illustrative embodiment, an apparatus comprises a base, an ultrasonic transducer, and a cap. The base comprises a transducer chamber, wherein the transducer chamber comprises a transducer chamber floor, a transducer chamber edge, and transducer chamber walls extending from the transducer chamber floor to the transducer chamber edge. The ultrasonic transducer is attached to the transducer chamber floor. The cap is welded to the transducer chamber edge such that the cap, along with the transducer chamber floor and the transducer chamber walls, encloses the transducer chamber to form an enclosed air space between the ultrasonic transducer and the cap.

In another illustrative embodiment, a method of enhancing reliability of an ultrasonic fluid measurement probe comprises generating an ultrasonic signal by an ultrasonic transducer in a base of the ultrasonic fluid measurement probe such that the ultrasonic signal is directed into a tube attached to the base of the ultrasonic fluid measurement probe and detecting a reflection of the ultrasonic signal by the ultrasonic transducer. The ultrasonic transducer is in a transducer chamber in the base of the ultrasonic fluid measurement probe. The transducer chamber comprises a transducer chamber floor, transducer chamber walls, and a cap welded to an edge of the transducer chamber walls such that the cap, along with the transducer chamber floor and the transducer chamber walls, encloses the transducer chamber to form an enclosed air space.

In another illustrative embodiment, a method of enhancing reliability of an ultrasonic fluid measurement probe comprises attaching an ultrasonic transducer to a transducer chamber floor of a transducer chamber in a base. The transducer chamber comprises the transducer chamber floor, a transducer chamber edge, and transducer chamber walls extending from the transducer chamber floor to the transducer chamber edge. A cap is welded to the transducer chamber edge such that the cap, along with the transducer chamber floor and the transducer chamber walls, encloses the transducer chamber to form an enclosed air space between the ultrasonic transducer and the cap.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
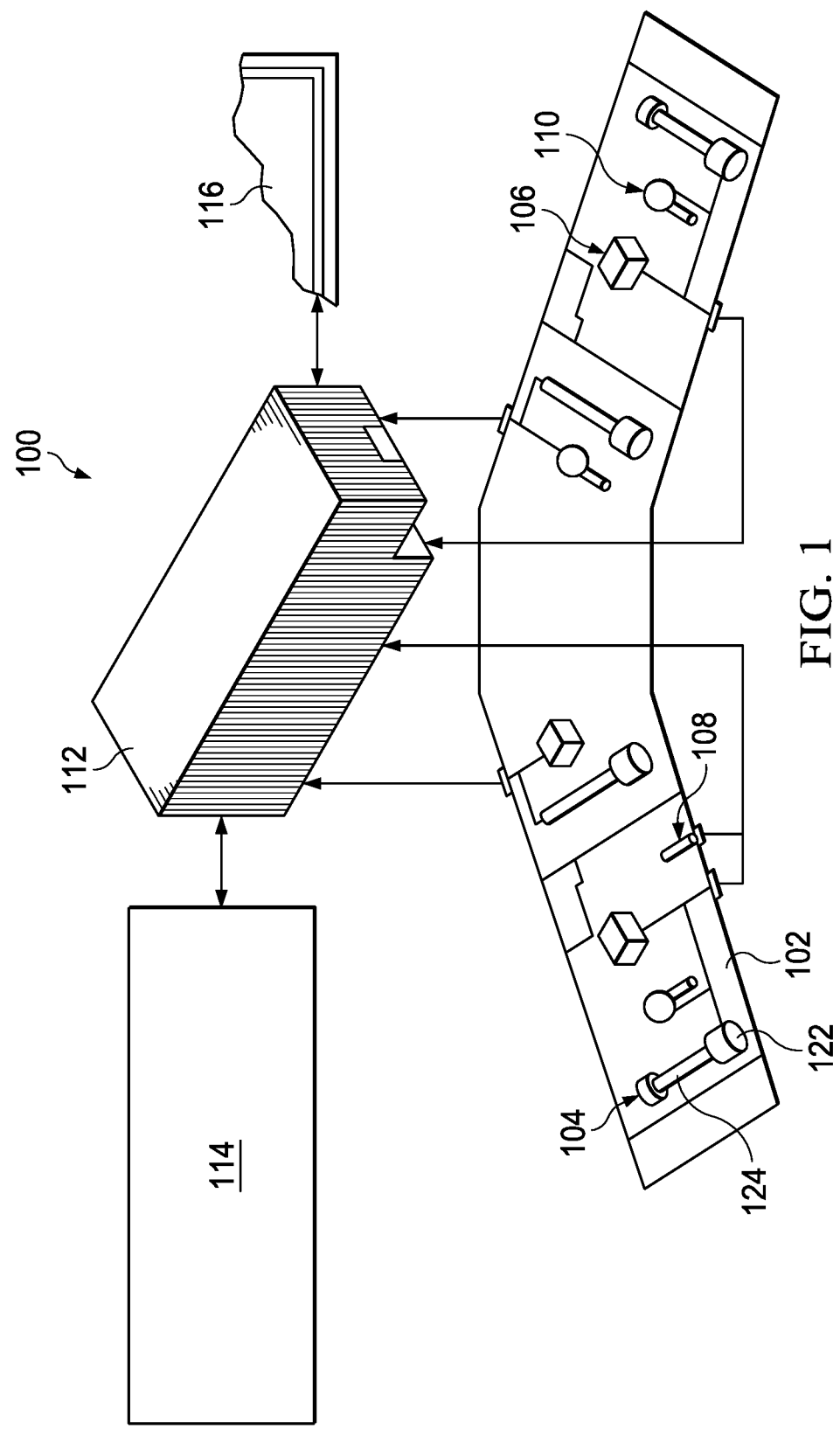
FIG. 1 is an illustration of a block diagram of an ultrasonic fuel gauging system in accordance with an illustrative embodiment.

The illustrative embodiments recognize and take into account different considerations. For example, the illustrative embodiments recognize and take into account that ultrasonic fuel measuring probes in fuel tanks on aircraft may be subject to extreme environmental conditions which may cause them to need to be repaired or replaced prematurely. An aircraft may need to be removed from service and maintenance personnel may need to perform a fuel tank entry when an ultrasonic fuel probe in an aircraft fuel tank needs to be repaired or replaced. Fuel tank entry by maintenance personnel to repair or replace a fuel probe requires draining and purging of the fuel tank. In many cases, repair or replacement of an ultrasonic fuel probe in the fuel tank of an aircraft may require up to two days of down time in which the aircraft is out of service. Such down time may be very costly to an airline or other operator of the aircraft.

There may be relatively very many ultrasonic fuel measurement probes on an aircraft. For example, a Boeing 777-300ER passenger aircraft may use 76 ultrasonic fuel measurement probes in a fuel quantity indicating system.

Illustrative embodiments recognize and take into account that reliability for commercial passenger aircraft and other aircraft may be improved and the cost of operating such aircraft reduced by reducing the need to repair or replace the ultrasonic fuel measurement probes that may be used for fuel gauging in such aircraft.

Illustrative embodiments recognize and take into account that the polysulfide potting around the transducer in the base of a conventional ultrasonic fuel measurement probe may not perform as desired and thereby may allow fuel ingress into the foam pad area of the transducer. Fuel in the foam pad compromises the air space around the transducer and may result in the transducer being sensitive to reflections from the opposite direction it was intended to. This sensitivity to reflections from the opposite direction than intended may result in a reading from the ultrasonic transducer of a fuel height corresponding to the distance between the ultrasonic transducer and the bottom of the fuel tank on which the ultrasonic fuel measurement probe is placed. For example, a conventional ultrasonic fuel measurement probe in which an inconsistency in the polysulfide potting material results in fuel in the foam pad area around the ultrasonic transducer may provide a reading that indicates a fuel height of one or two centimeters regardless of the actual height of fuel in the fuel tank.

Illustrative embodiments recognize and take into account that the polysulfide potting material in the base of an ultrasonic fuel measurement probe that is used to measure fuel height in an aircraft fuel tank may flex as the aircraft changes altitude from ground level to cruise altitude. Air trapped in the air space between the polysulfide potting material and the ultrasonic transducer remains at ground level pressure, therefore, the polysulfide potting material must endure a pressure difference between the pressure at ground level and the pressure at cruise level. For example, without limitation, the polysulfide potting material may be required to endure a pressure difference between sea level pressure in the air space on one side of the polysulfide potting material and the pressure at a cruising altitude near 40,000 feet above sea level on the other side of the polysulfide potting material. Such a pressure differential may cause the polysulfide potting material to expand under internal pressure from the air in the air space as the aircraft climbs from the ground to cruising altitude and then contract again as the aircraft descends from cruising altitude to the ground for landing. This cyclic mechanical stress may eventually compromise the seal of the polysulfide potting material. This cyclic mechanical stress also may cause tension in the wires that are soldered to the ultrasonic transducer disk, which may cause inconsistencies in the solder joints.

Illustrative embodiments also recognize and take into account that various manufacturing issues may be associated with the use of polysulfide potting material in the base of an ultrasonic fluid measurement probe. For example, without limitation, contamination of the polysulfide potting material, achieving the appropriate ratio of materials that may be mixed together to form the polysulfide potting material, and achieving an acceptable consistency in the thickness of the polysulfide potting material deposited on the base of the probe may be some of the issues associated with the use of a polysulfide potting material in the base of a known ultrasonic fluid measurement probe.

Illustrative embodiments recognize and take into account that sealing the transducer chamber in the base of an ultrasonic fluid measurement probe with a polysulfide potting material may be relatively messy and difficult to accomplish. For example, without limitation, the surfaces of the base that are to be adjacent to the polysulfide potting material may have to be bead blasted and cleaned thoroughly to allow the polysulfide potting material to adhere completely. The polysulfide material used for the potting in an ultrasonic fluid measurement probe for fuel gauging may be made from a two part compound that may require mixing in precise ratios for curing and that must be contamination free. Furthermore, deposition of the polysulfide potting material on the base of an ultrasonic fluid measurement probe to seal the transducer chamber may require expert skilled labor.

Illustrative embodiments eliminate the foam pad and polysulfide potting material used in the base of a conventional ultrasonic fuel probe. In accordance with an illustrative embodiment, the cavity containing the ultrasonic transducer is sealed with a plastic cap that is ultrasonically welded to the base. The foam pad and polysulfide potting material used in conventional ultrasonic fuel probes are not required.

Ultrasonic welding of a cap to seal the air space around the ultrasonic transducer of an ultrasonic fluid measurement probe may reduce or eliminate the various limitations of using polysulfide potting material in the base of an ultrasonic fluid measurement probe for such purpose. The strength and durability of the ultrasonically welded cap would not only eliminate the manufacturing issues associated with using a polysulfide potting material, but would also provide a significantly more robust design against environmental stresses. The result is a part that is more easily manufactured and more durable. An ultrasonic fuel measurement probe in accordance with an illustrative embodiment would not need to be repaired or replaced as often as a conventional ultrasonic fluid measurement probe using polysulfide potting material.

Turning to FIG. 1, an illustration of a block diagram of an ultrasonic fuel gauging system is depicted in accordance with an illustrative embodiment. For example, without limitation, ultrasonic fuel gauging system 100 may comprise part of a fuel quantity indicating system for indicating the amount of fuel in fuel tanks 102 on an aircraft.

Ultrasonic fuel gauging system 100 may be configured to perform a variety of functions. For example, without limitation, ultrasonic fuel gauging system 100 may be configured to measure fuel quantity in fuel tanks 102, calculate the weight of fuel in fuel tanks 102, measure the temperature of the fuel in fuel tanks 102, control fueling operations, and show when there is water in fuel tanks 102.

Components of fuel gauging system 100 may include ultrasonic sensor probes 104 for measuring fuel height, densitometers 106, temperature sensors 108, and water detectors 110. Each ultrasonic sensor probe 104 may comprise base 122 and tube 124. Base 122 of each ultrasonic sensor probe 104 may comprise an ultrasonic transducer. Densitometers 106 measure the fuel density in each fuel tank 102.

Appropriate wiring may be used to connect the ultrasonic fuel sensor probes 104 to fuel quantity processor unit 112. Fuel quantity processor unit 112 may send a signal to each ultrasonic sensor probe 104 to find the fuel height. The ultrasonic sensor probe 104 sends a sound pulse from base 122 at the bottom of fuel tank 102 to the fuel surface in tube 124 attached to base 122. Fuel quantity processor unit 112 calculates the fuel height by measuring the time it takes for the pulse to give a reflection back to base 118.

Fuel quantity processor unit 112 may use the fuel height to calculate the fuel volume. Fuel quantity processor unit 112 may then multiply fuel volume and density to calculate the fuel weight. Fuel quantity processor unit 112 may send fuel quantity data to integrated refuel panel 114 and to display 116 on the flight deck of the aircraft.

The speed of the ultrasonic signal sent through the fuel in ultrasonic sensor probe 104 is dependent on fuel density and temperature. Densitometer 106 in each fuel tank 102 may be used to calculate fuel type during refueling. Some of ultrasonic sensor probes 104 may be calibration probes configured to calibrate the calculations of fuel height based on the information provided by other ultrasonic sensor probes 104 in fuel tanks 102.

Figure 2:
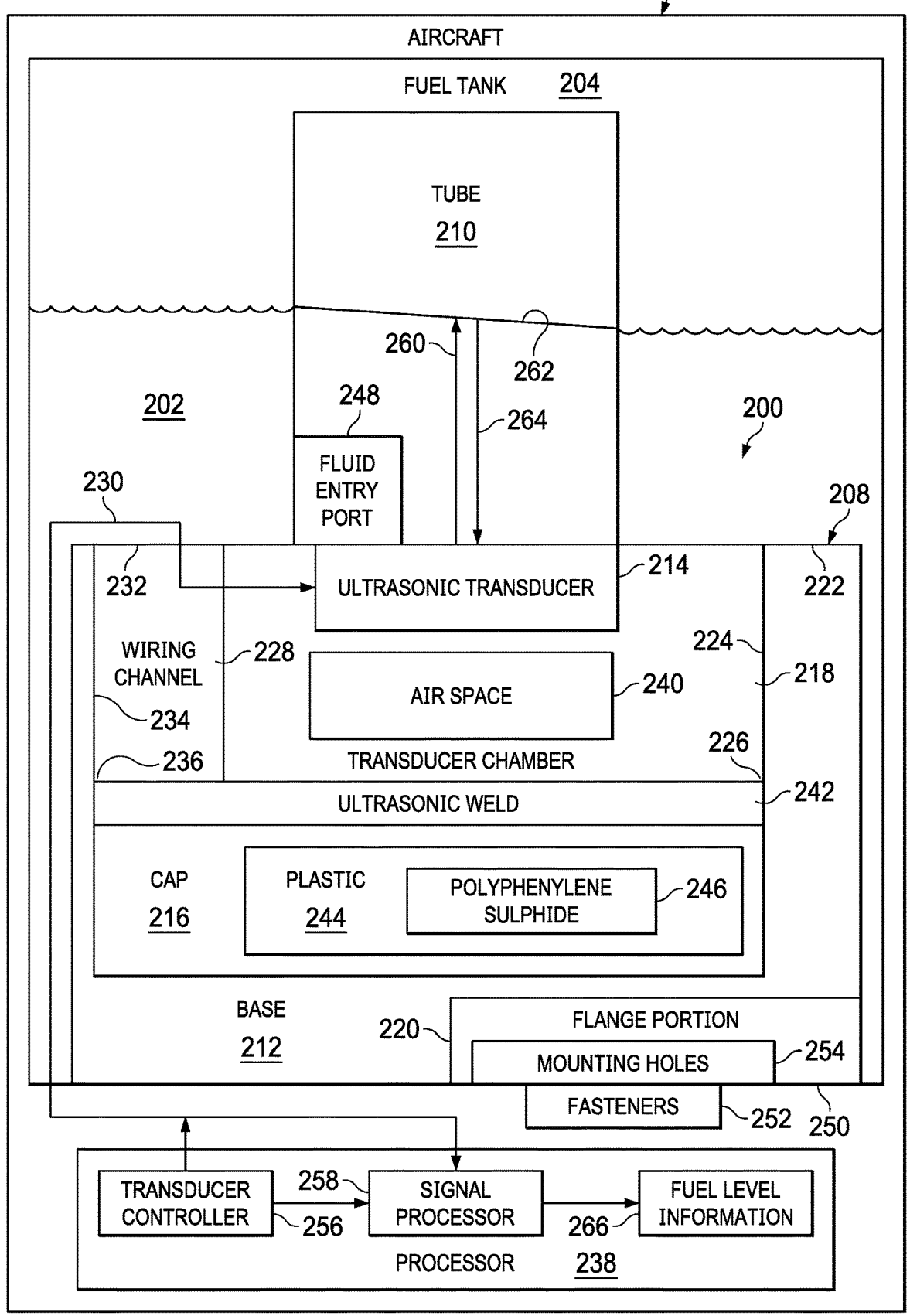
FIG. 2 is an illustration of a block diagram of an ultrasonic fluid measurement probe with an ultrasonically welded base cap in accordance with an illustrative embodiment.

Turning to FIG. 2, an illustration of a block diagram of an ultrasonic fluid measurement probe with an ultrasonically welded base cap is depicted in accordance with an illustrative embodiment. Probe 200 may be an ultrasonic fluid measurement probe that is used to determine the quantity of fuel 202 in fuel tank 204. In this case, probe 200 may be referred to as an ultrasonic fuel measurement probe or an ultrasonic fuel gauging probe.

Probe 200 may be used to determine the quantity of fuel 202 in fuel tank 204 on aircraft 206. Aircraft 206 may comprise any appropriate type of vehicle that is configured to operate in the air. For example, without limitation, aircraft 206 may be a commercial passenger aircraft, a transportation aircraft, a military aircraft, a personal aviation aircraft, or any other type of aircraft configured to perform any appropriate operation or mission.

Alternatively, or in addition, probe 200 may be used to determine the quantity of fuel 202 in fuel tank 204 in a vehicle other than aircraft 206 or on any appropriate platform other than a vehicle. Alternatively, or in addition, probe 200 may be used to measure fluids other than fuels in containers or environments other than fuel tanks. For example, without limitation, probe 200 in accordance with an illustrative embodiment may be used to measure water in a water tank, fluid waste in a waste tank, or any other appropriate fluid in any other appropriate container or environment.

Probe 200 may comprise base assembly 208 and tube 210. Base assembly 208 may comprise base 212, ultrasonic transducer 214, and cap 216. Base 212 may comprise transducer chamber 218 and flange portion 220. Base 212 may be made of any appropriate material and by any appropriate method. For example, without limitation, base 212 may be molded of a single piece of plastic.

Transducer chamber 218 may be defined by transducer chamber floor 222 and transducer chamber walls 224 that extend from transducer chamber floor 222. Transducer chamber walls 224 may terminate at transducer chamber edge 226.

Ultrasonic transducer 214 may be attached to transducer chamber floor 222 inside transducer chamber 218. For example, without limitation, ultrasonic transducer 214 may comprise a piezoelectric transducer that is glued to transducer chamber floor 222 using any appropriate adhesive. Alternatively, ultrasonic transducer 214 may comprise any other appropriate transducer that may be attached to transducer chamber floor 222 using any other appropriate method, material, or structure.

Base 212 may also comprise wiring channel 228. Wiring channel 228 may be in communication with transducer chamber 218 such that wires 230 may be run through wiring channel 228 in to transducer chamber 218. Wiring channel 228 may be defined by wiring channel floor 232 and wiring channel walls 234 that extend from wiring channel floor 232. Wiring channel walls 234 may terminate at wiring channel edge 236.

Wires 230 may be run from processor 238 through wiring channel floor 232, through wiring channel 228, into transducer chamber 218, and be attached to ultrasonic transducer 214. Wires 230 may be attached to ultrasonic transducer 214 in any appropriate manner. For example, without limitation, wires 230 may be soldered to ultrasonic transducer 214.

Cap 216 may be attached to transducer chamber edge 226 to thereby enclose transducer chamber 218 and form enclosed air space 240 between ultrasonic transducer 214 and cap 216. Cap 216 also may be attached to wiring channel edge 236 to enclose wiring channel 234.

Cap 216 preferably may be ultrasonically welded to transducer chamber edge 226 and to wiring channel edge 236. Cap 216 thus may be attached to transducer chamber edge 226 and to wiring channel edge 236 by ultrasonic weld 242.

Cap 216 may be made of any appropriate material and by any appropriate method. For example, cap 216 may be made of any appropriate plastic 244 by molding, by cutting cap 216 from a piece of plastic 244, or in any other appropriate manner. For example, without limitation, cap 216, may be made of polyphenylene sulphide 246.

Tube 210 is attached to base assembly 208 such that an ultrasonic signal generated by ultrasonic transducer 214 is directed into tube 210. Tube 210 may be attached to base assembly 208 in any appropriate manner. Fluid entry port 248 may be formed in tube 210 at or near where tube 210 is attached to base assembly 208. Fluid entry port 248 may be configured in any appropriate manner to allow a fluid, such as fuel 202, to enter tube 210 when probe 200 is placed in the fluid to measure the level of the fluid.

Probe 200 may be used to measure the level of fuel 202 in fuel tank 204 by attaching base assembly 208 of probe 200 to bottom 250 of fuel tank 204 such that tube 210 extends upward from bottom 250 of fuel tank 204. Fuel 202 may then enter tube 210 through fluid entry port 248 and rise to a level corresponding to the level of fuel 202 in fuel tank 204. For example, without limitation, probe 200 may be attached to bottom 250 of fuel tank 204 by using any appropriate fasteners 252 extending through mounting holes 254 in flange portion 220 of base 212 and into bottom 250 of fuel tank 204.

Processor 238 may comprise transducer controller 256 and signal processor 258. Transducer controller 256 may be configured to send a signal on wires 230 to ultrasonic transducer 214 to cause ultrasonic transducer 214 to generate ultrasonic signal 260. Ultrasonic signal 260 is directed through fuel 202 in tube 210 and is reflected off of surface 262 of fuel 202 in tube 210. Reflected ultrasonic signal 264 is directed from surface 262 of fuel 202 through tube 210 back to ultrasonic transducer 214. Ultrasonic transducer 214 sends a signal on wires 230 back to processor 238 in response to receiving reflected ultrasonic signal 264. Signal processor 258 in processor 238 may then process the signal received from ultrasonic transducer 214 in a known manner to provide fuel level information 266 from which the level of fuel 202 in fuel tank 204 may be determined.

The illustration of ultrasonic fluid measurement probe 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
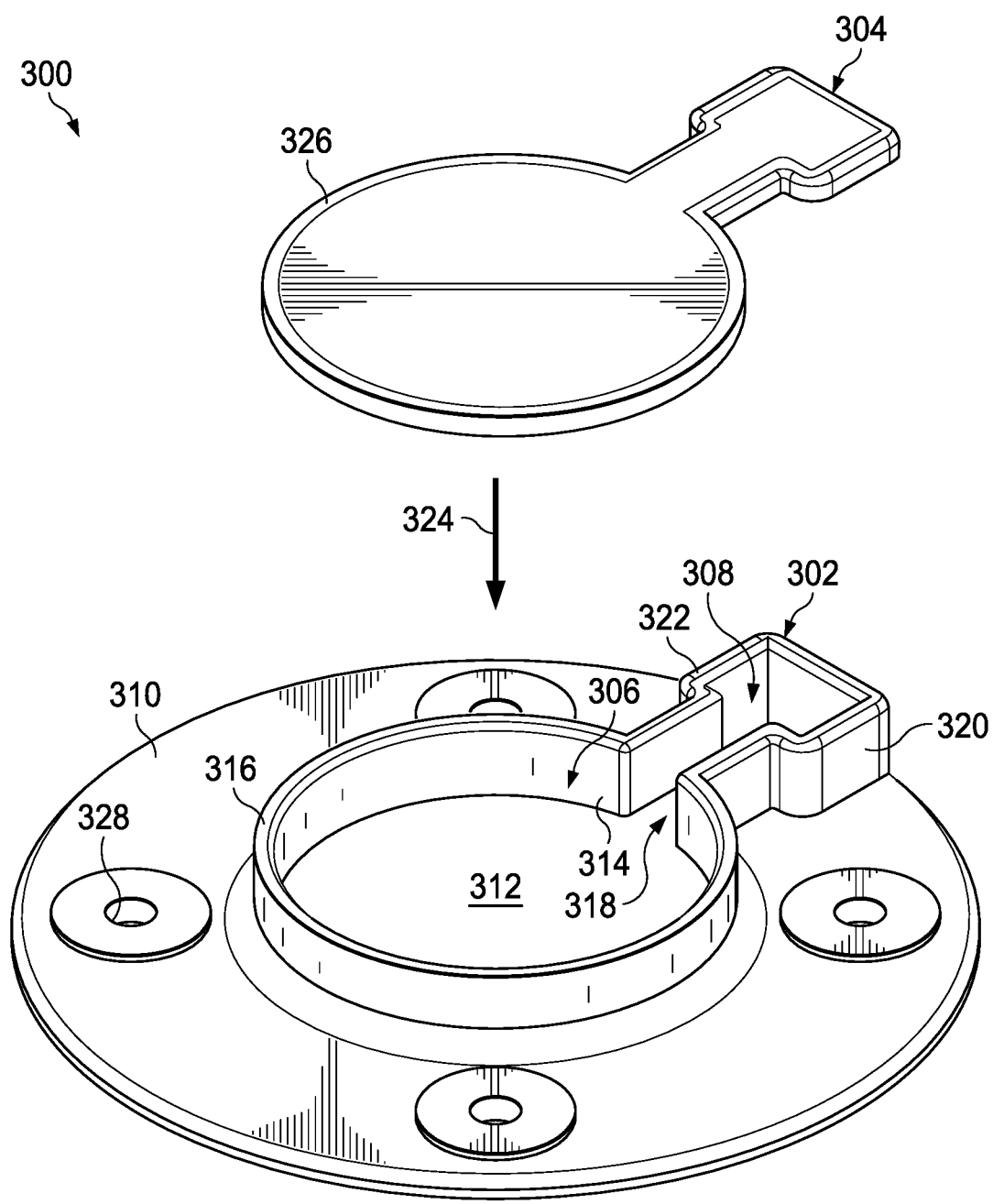
FIG. 3 is an illustration of an exploded perspective view of a base assembly for an ultrasonic fluid measurement probe in accordance with an illustrative embodiment.

Turning to FIG. 3, an illustration of an exploded perspective view of a base assembly for an ultrasonic fluid measurement probe is depicted in accordance with an illustrative embodiment. Base assembly 300 may be an example of one implementation of base assembly 208 for ultrasonic fluid measurement probe 200 in FIG. 2.

Base assembly 300 comprises base 302 and cap 304. Base 302 comprises transducer chamber 306, wiring channel 308, and flange portion 310. Transducer chamber 306 is defined by transducer chamber floor 312 and transducer chamber walls 314. Transducer chamber walls 314 extend from transducer chamber floor 312 to transducer chamber edge 316. An ultrasonic transducer may be attached to transducer chamber floor 312 inside transducer chamber 306.

Wiring channel 308 is in communication with transducer chamber 306 such that wires may be run through wiring channel 308 into transducer chamber 306. Wiring channel 308 is defined by wiring channel floor 318 and wiring channel walls 320. Wiring channel walls 320 extend from wiring channel floor 318 to wiring channel edge 322.

Cap 304 may be placed over transducer chamber 306 and wiring channel 308, by moving cap 304 in the direction of arrow 324, such that edge 326 of cap 304 is aligned with transducer chamber edge 316 and wiring channel edge 322 to thereby enclose transducer chamber 306 and wiring channel 308. Cap 304 may be attached to transducer chamber edge 316 and wiring channel edge 322 by ultrasonically welding edge 326 of cap 304 to transducer chamber edge 316 and wiring channel edge 322.

Flange portion 310 extends radially outward from transducer chamber 306. Mounting holes 328 are formed in flange portion 310 such that base assembly 300 may be attached to a surface by extending appropriate fasteners through mounting holes 328 into the surface.

Figure 4:
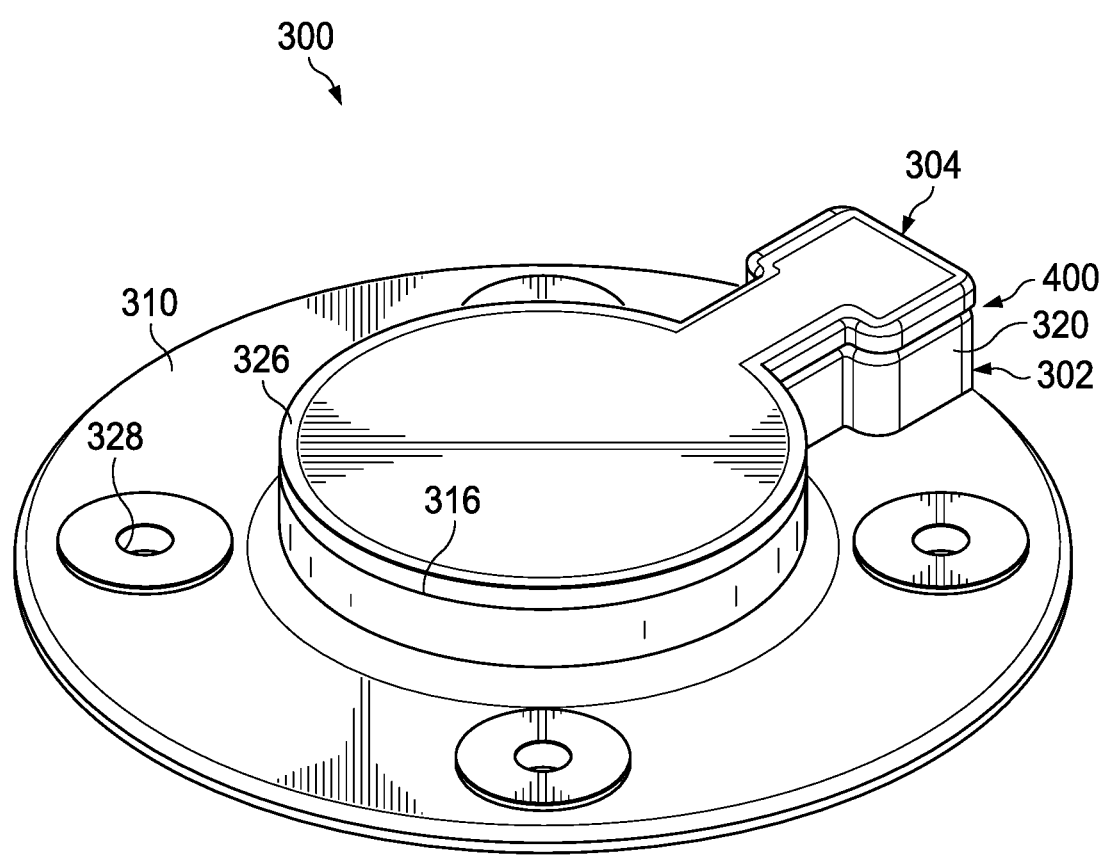
FIG. 4 is an illustration of a perspective view of the base assembly for an ultrasonic fluid measurement probe of FIG. 3 with a cap ultrasonically welded to a base in accordance with an illustrative embodiment.

Turning to FIG. 4, an illustration of a perspective view of the base assembly 300 for an ultrasonic fluid measurement probe of FIG. 3 with cap 304 ultrasonically welded to base 302 is depicted in accordance with an illustrative embodiment. An ultrasonic weld is thus formed at joint 400 between cap 304 and base 302.

Figure 5:
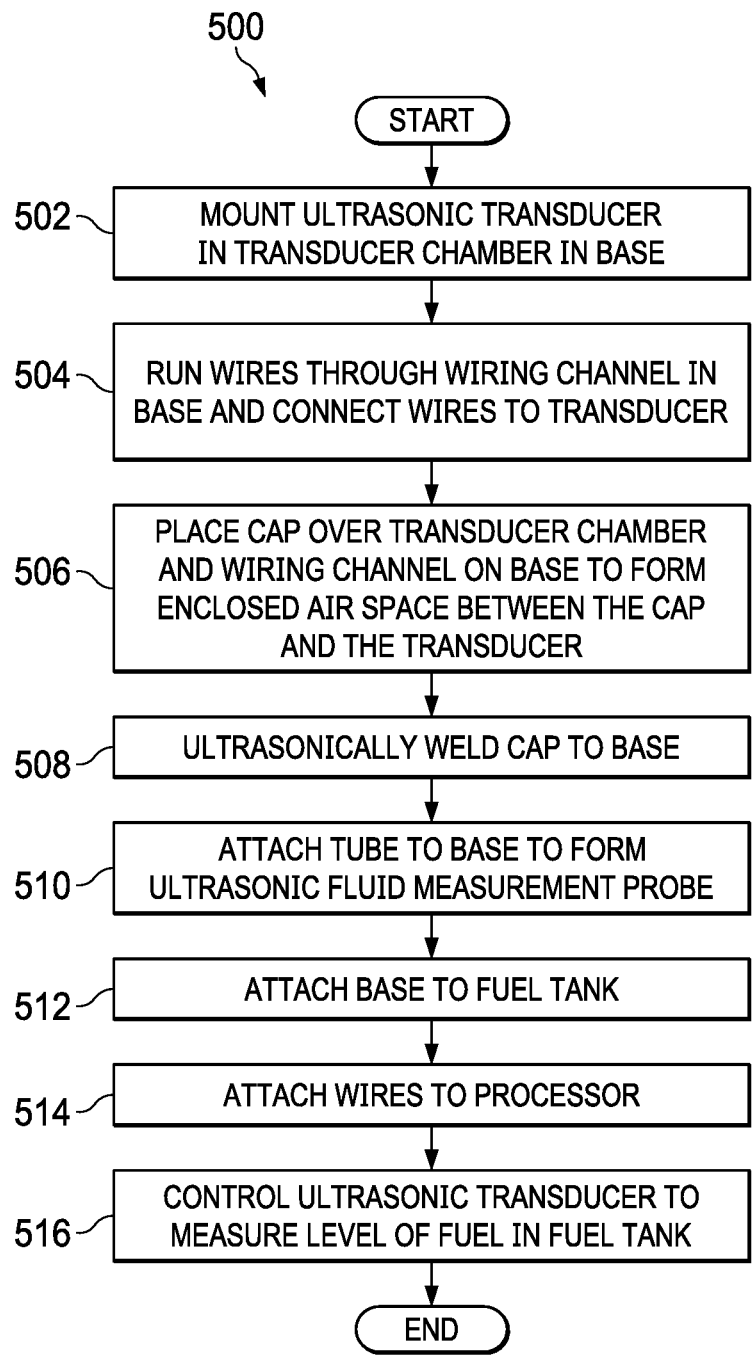
FIG. 5 is an illustration of a flow chart of a method of making and using an ultrasonic fluid measurement probe in accordance with an illustrative embodiment.

Turning to FIG. 5, an illustration of a flow chart of a method of making and using an ultrasonic fluid measurement probe is depicted in accordance with an illustrative embodiment. Process 500 may be an example of one method for making and using ultrasonic fluid measurement probe 200 in FIG. 2.

Process 500 may begin with mounting an ultrasonic transducer in a transducer chamber in a base (operation 502). Wires may be run through a wiring channel in the base and connected to the ultrasonic transducer (operation 504). A cap may then be placed over the transducer chamber and the wiring channel on the base to form an enclosed air space between the cap and the transducer (operation 506). The cap may then be ultrasonically welded to the base to form a base assembly (operation 508). A tube may then be attached to the base assembly to form the ultrasonic fluid measurement probe (operation 510).

The ultrasonic fluid measurement probe may then be mounted in a fuel tank by attaching the base assembly to the fuel tank (operation 512). The wires from the ultrasonic transducer may then be connected to a processor (operation 514). The processor may then control the ultrasonic transducer to measure the level of fuel in the fuel tank (operation 516), with the process terminating thereafter.

The flowcharts and block diagrams described herein illustrate the architecture, functionality, and operation of possible implementations of systems and methods according to various illustrative embodiments. In some alternative implementations, the operation noted in a block may occur out of the order noted in the figures. For example, the operations of two blocks shown in succession may be performed substantially concurrently, or the operations of the blocks may sometimes be performed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
    a base comprising a transducer chamber, wherein the transducer chamber comprises a transducer chamber floor, a transducer chamber edge, and transducer chamber walls extending from the transducer chamber floor to the transducer chamber edge;
    an ultrasonic transducer attached to the transducer chamber floor;
    a tube comprising an end, the end attached to the base such that an ultrasonic signal generated by the ultrasonic transducer is directed into the tube;
    a fluid entry port formed in the tube where the tube is attached to the base; and
    a cap welded to the transducer chamber edge and that, along with the transducer chamber floor and the transducer chamber walls, encloses the transducer chamber to form an enclosed air space between the ultrasonic transducer and the cap.

2. The apparatus of claim 1, wherein the base further comprises:
    a flange portion, and
    a mounting hole in the flange portion.

3. The apparatus of claim 1, wherein the base further comprises:
    a wiring channel in communication with the transducer chamber, wherein the wiring channel comprises a wiring channel floor, a wiring channel edge, and wiring channel walls extending from the wiring channel floor to the wiring channel edge; and
    wherein the cap is welded to the wiring channel edge.

4. The apparatus of claim 3 further comprising wires attached to the ultrasonic transducer and extending from the ultrasonic transducer, through the transducer chamber, through the wiring channel, and through the wiring channel floor.

5. The apparatus of claim 4, wherein the wires are soldered to the ultrasonic transducer.

6. The apparatus of claim 1, wherein the ultrasonic transducer is a piezoelectric transducer.

7. The apparatus of claim 1, wherein the cap is made of plastic.

8. The apparatus of claim 7, wherein the cap is made of polyphenylene sulphide.

9. The apparatus of claim 1, wherein the base is attached to an inside surface of a fuel tank on an aircraft such that the tube extends from the base into the fuel tank.

10. A method of enhancing reliability of an ultrasonic fluid measurement probe, comprising:
generating an ultrasonic signal by an ultrasonic transducer in a transducer chamber in a base of the ultrasonic fluid measurement probe such that the ultrasonic signal is directed into a tube, the tube comprising an end attached to the base of the ultrasonic fluid measurement probe, wherein the transducer chamber comprises a transducer chamber floor, transducer chamber walls, and a cap welded to an edge of the transducer chamber walls such that the cap, along with the transducer chamber floor and the transducer chamber walls, encloses the transducer chamber to form an enclosed air space; and
detecting a reflection of the ultrasonic signal by the ultrasonic transducer.

11. The method of claim 10 further comprising processing the detected reflection of the ultrasonic signal to determine a level of fluid in a container.

12. The method of claim 11, wherein processing the detected reflection of the ultrasonic signal to determine the level of fluid in a container comprises processing the detected reflection of the ultrasonic signal to determine a level of fuel in a fuel tank.

13. The method of claim 10, wherein the base further comprises a wiring channel in communication with the transducer chamber, wherein the wiring channel comprises a wiring channel floor, a wiring channel edge, and wiring channel walls extending from the wiring channel floor to the wiring channel edge, and wherein the cap is welded to the wiring channel edge.

14. A method of enhancing reliability of an ultrasonic fluid measurement probe, comprising:
attaching an ultrasonic transducer to a transducer chamber floor of a transducer chamber in a base, wherein the transducer chamber comprises the transducer chamber floor, a transducer chamber edge, and transducer chamber walls extending from the transducer chamber floor to the transducer chamber edge;
welding a cap to the transducer chamber edge such that the cap, along with the transducer chamber floor and the transducer chamber walls, encloses the transducer chamber to form an enclosed air space between the ultrasonic transducer and the cap; and
attaching an end of a tube to the base such that an ultrasonic signal generated by the ultrasonic transducer is directed into the tube.

15. The method of claim 14, wherein the base further comprises a wiring channel in communication with the transducer chamber, wherein the wiring channel comprises a wiring channel floor, a wiring channel edge, and wiring channel walls extending from the wiring channel floor to the wiring channel edge, and further comprising:
welding the cap to the wiring channel edge.

16. The method of claim 15 further comprising:
attaching wires to the ultrasonic transducer; and
extending the wires from the ultrasonic transducer, through the transducer chamber, through the wiring channel, and through the wiring channel floor.

17. The method of claim 14, wherein the cap is made of plastic.

18. The method of claim 17, wherein the cap is made of polyphenylene sulphide.

19. The method of claim 17, wherein welding the cap to the transducer chamber edge comprises ultrasonically welding the cap to the transducer chamber edge.

20. The method of claim 14 further comprising detecting a reflection of the ultrasonic signal by the ultrasonic transducer and processing the detected reflection of the ultrasonic signal to determine a level of fluid in a container.

\* \* \* \* \*